United States Patent
Kim et al.

(10) Patent No.: US 11,856,633 B2
(45) Date of Patent: Dec. 26, 2023

(54) METHOD AND APPARATUS FOR PERFORMING COMMUNICATION IN MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 17/113,545

(22) Filed: Dec. 7, 2020

(65) Prior Publication Data

US 2021/0092794 A1 Mar. 25, 2021

Related U.S. Application Data

(63) Continuation of application No. 16/282,973, filed on Feb. 22, 2019, now Pat. No. 10,917,933.

(30) Foreign Application Priority Data

Feb. 23, 2018 (KR) ........................ 10-2018-0022235

(51) Int. Cl.
*H04W 76/27* (2018.01)
*H04W 52/02* (2009.01)
*H04W 68/02* (2009.01)

(52) U.S. Cl.
CPC ....... *H04W 76/27* (2018.02); *H04W 52/0245* (2013.01); *H04W 68/02* (2013.01)

(58) Field of Classification Search
CPC ........... H04W 36/005; H04W 36/0033; H04W 36/08; H04W 48/18; H04W 52/0216;
(Continued)

(56) References Cited

U.S. PATENT DOCUMENTS 9,161,267 B2   10/2015   Makharia et al.
9,549,367 B2   1/2017    Horn et al.
(Continued)

FOREIGN PATENT DOCUMENTS

CN   101911785 A   12/2010
CN   104221451 A   12/2014
(Continued)

OTHER PUBLICATIONS

3GPP TS 36.331 V14.4.0 (Sep. 2017); 3rd Generation Partnership Project; Technical Specification Group Radio Access Network; Evolved Universal Terrestrial Radio Access (E-UTRA); Radio Resource Control (RRC); Protocol specification (Release 14) (Year: 2017).*

(Continued)

*Primary Examiner* — Gary Mui
(74) *Attorney, Agent, or Firm* — Jefferson IP Law, LLP

(57) ABSTRACT

A method of performing cell selection, by a terminal, in a wireless communication system is provided. The method includes receiving a control message including configuration information for a radio resource control (RRC) inactive state, entering the RRC inactive state based on the configuration information; performing cell selection, and in response to a suitable cell not being found and an acceptable cell being found in the cell selection, entering an RRC idle state.

12 Claims, 16 Drawing Sheets

(58) Field of Classification Search
CPC ........... H04W 52/229; H04W 52/0241; H04W 52/0245; H04W 68/02; H04W 76/27
See application file for complete search history.

(56) References Cited

U.S. PATENT DOCUMENTS

| | | | |
|---|---|---|---|
| 9,655,148 | B2 | 5/2017 | Jung et al. |
| 10,159,025 | B2 | 12/2018 | Hong et al. |
| 2010/0159928 | A1 | 6/2010 | Wu |
| 2010/0255807 | A1 | 10/2010 | Umatt et al. |
| 2013/0039339 | A1 | 2/2013 | Rayavarapu et al. |
| 2013/0260761 | A1 | 10/2013 | Walke et al. |
| 2014/0038607 | A1 | 2/2014 | Makharia et al. |
| 2014/0160976 | A1* | 6/2014 | Dimou .................... H04W 8/08 370/252 |
| 2016/0119959 | A1 | 4/2016 | Jung et al. |
| 2017/0223767 | A1 | 8/2017 | Jung et al. |
| 2017/0303240 | A1 | 10/2017 | Basu Mallick et al. |
| 2017/0311290 | A1 | 10/2017 | Adjakple et al. |
| 2018/0041901 | A1 | 2/2018 | Yilmaz et al. |
| 2018/0041936 | A1 | 2/2018 | Kim et al. |
| 2018/0139669 | A1* | 5/2018 | Jung .................... H04W 36/06 |
| 2018/0176972 | A1 | 6/2018 | Jung et al. |
| 2018/0206080 | A1* | 7/2018 | Chen .................... H04W 72/005 |
| 2018/0227961 | A1 | 8/2018 | Mallick et al. |
| 2018/0234890 | A1* | 8/2018 | Shih .................... H04W 60/00 |
| 2018/0234894 | A1 | 8/2018 | Jiang |
| 2018/0279275 | A1 | 9/2018 | Chen et al. |
| 2019/0037635 | A1 | 1/2019 | Guo et al. |
| 2019/0053118 | A1 | 2/2019 | Hahn et al. |
| 2019/0191483 | A1 | 6/2019 | Ryoo et al. |
| 2020/0008063 | A1 | 1/2020 | Selvaganapathy et al. |
| 2020/0067589 | A1 | 2/2020 | Jeong et al. |
| 2020/0068646 | A1 | 2/2020 | Kwon |
| 2020/0154325 | A1* | 5/2020 | Jiang ............... H04W 36/00835 |
| 2020/0213938 | A1 | 7/2020 | Kim et al. |
| 2020/0236731 | A1* | 7/2020 | Jung .................... H04W 68/02 |
| 2020/0280916 | A1* | 9/2020 | Tang ................. H04W 52/0212 |
| 2020/0351723 | A1* | 11/2020 | Kim .................... H04W 36/0033 |
| 2021/0067945 | A1* | 3/2021 | Liu .................... H04W 76/10 |
| 2021/0068010 | A1* | 3/2021 | Xu .................... H04W 36/0061 |
| 2021/0337371 | A1* | 10/2021 | Ianev .................... H04W 48/16 |

FOREIGN PATENT DOCUMENTS

| | | |
|---|---|---|
| CN | 106105356 A | 11/2016 |
| CN | 106658758 A | 5/2017 |
| CN | 106688282 A | 5/2017 |
| CN | 107211342 A | 9/2017 |
| CN | 107211470 A | 9/2017 |
| EP | 2 934 939 A1 | 10/2015 |
| EP | 3361821 A1 | 8/2018 |
| EP | 3738355 * | 2/2023 |
| KR | 10-2017-0125293 A | 11/2017 |
| KR | 10-2018-0015589 A | 2/2018 |
| WO | 2013/066060 A1 | 5/2013 |
| WO | 2014/182106 A1 | 11/2014 |
| WO | 2015/142147 A1 | 9/2015 |
| WO | 2017/140342 A1 | 8/2017 |

OTHER PUBLICATIONS

3GPP TS 36.304 V14.4.0 (Sep. 2017); 3rd Generation Partnership Project; Technical Specification Group Radio Access Network; Evolved Universal Terrestrial Radio Access (E-UTRA); User Equipment (UE) procedures in idle mode (Release 14) (Year: 2017).*
InterDigital Communications; "State Transition from Inactive to Idle for NR"; 3GPP TSG-RAN WG2 #97 Athens, Greece Feb. 13-17, 2017; R2-1701189 (Year: 2017).*
Sony, NEC; "TS 23.502: Provisioning parameter: Expected UE Mobility" Sa WG2 Meeting #124 Nov. 27-Dec. 1, 2017, Reno, US S2-178407 Agenda Item: 6.5.7.1 (Year: 2017).*
3GPP TR 38.804 V14.0.0 (Mar. 2017); 3rd Generation Partnership Project; Technical Specification Group Radio Access Network; Study on New Radio Access Technology; Radio Interface Protocol Aspects (Release 14); (Year: 2017).
3rd Generation Partnership Project; Technical Specification Group Radio Access Network;NR; User Equipment{UE) procedures in Idle mode and RRC Inactive state{Release 15),3GPP Draft; F-06921, Feb. 19, 2018, XP051400751.
Kiaomi:"Consideration on the triggers of transiting UE from Inactive to Idle", 3GPP Draft; R2-1711035, F-06921 SOP, vol. TSG RAN, No. Prague, Czech; Oct. 9, 2017-Oct. 13, 2017, Oct. 8, 2017, XP051343044.
Extended European Search Report dated May 20, 2020, issued in European Application No. 19758271.1.
3GPP TS 36.304 V14.5.0 (Dec. 2017) 3rd Generation Partnership Project; Technical Specification Group Radio Access Network; Evolved Universal Terrestrial Radio Access (E-UTRA) User Equipment (UE) procedures in idle mode (Release 14) (Year: 2017).
3GPP TS 38.300 V15.0.0 (Dec. 2017) 3rd Generation Partnership Project; Technical Specification Group Radio Access Network; NR; NR and NG-RAN Overall Description; Stage 2 (Release 15) (Year: 2017).
International Search Report and Written Opinion dated Jun. 19, 2019, issued in International Application No. PCT/KR2019/002241.
Huawei et al., '23.501: Clarification of the interworking between 5G and GERAN/UTRAN/E-UTRAN when UE is in RRC-inactive stale', S2-180331, 3GPP TSG-SA WG2 Meeting #125 Gothenburg, Sweden, Jan. 16, 2018, See section 5.3.3.2.5.
Nokia et al., 'Cell selection/reselection basics for NR Idle—cell quality', R2-1713203, 3GPP TSG-RAN WG2 #99bis Prague, Czech Republic, Nov. 17, 2017, See section 9.1.
European Office Action dated Nov. 25, 2020, issued in European Application No. 19758271.1.
European Office Action dated Jun. 1, 2021, issued in European Application No. 19758271.1.
Apple Inc., "Cell reselection in Inactive state", 3GPP TSG-RAN WG2 Meeting #101, R2-1802416, Feb. 17, 2018.
LG Electronics Inc., "Inter-RAT mobility between NR and eLTE for Inactive state", 3GPP TSG-RAN WG2 Meeting #99bis, R2-1711690, Jun. 28, 2017.
Korean Office Action dated Nov. 18, 2021, issued in Korean Application No. 10-2018-0022235.
Korean Notice of Allowance dated May 20, 2022, issued in Korean Application No. 10-2018-0022235.
Indian Office Action dated Apr. 1, 2022, issued in Indian Application No. 202037021324.
Xiaomi, "Consideration on the triggers of transiting UE from Inactive to Idle," R2-1709169, 3GPP TSG-RAN NR #2, Qingdao, China, Jun. 27-29, 2017.
Chinese Office Action dated Dec. 29, 2022, issued in Chinese Application No. 201980014908.9.
European Summons for oral proceedings dated Nov. 21, 2022, issued in European Application No. 19758271.1.
CATT: "Consideration on state transitions",TSG-RAN WG2 Meeting #97bis; R2-1703111; Spokane, USA, Apr. 3-7, 2017.
Notice Of Allowance dated May 9, 2023, issued in European Application No. 19758271.1.
Brief Communication dated Mar. 29, 2023, issued in European Application No. 19758271.1.
Notice of Allowance dated Jul. 12, 2023, issued in Chinese Application No. 201980014908.9.
European Office Action dated Jul. 12, 2023, issued in European Application No. 19758271.1.

* cited by examiner

METHOD AND APPARATUS FOR PERFORMING COMMUNICATION IN MOBILE COMMUNICATION SYSTEM

CROSS-REFERENCE TO RELATED APPLICATION(S)

This application is a continuation application of prior application Ser. No. 16/282,973, filed Feb. 22, 2019, which is based on and claims priority under 35 U.S.C. § 119(a) of a Korean patent application No. 10-2018-0022235, filed on Feb. 23, 2018, in the Korean Intellectual Property Office, the disclosure of which is incorporated by reference herein in its entirety.

BACKGROUND

1. Field

The disclosure relates to mobile communication systems, and more particularly, to a method and apparatus for performing communication in a mobile communication system.

2. Description of Related Art

To meet the increase in demand with respect to wireless data traffic after the commercialization of 4G communication systems, considerable efforts have been made to develop pre-5G communication systems or 5G communication systems. This is one reason why '5G communication systems' or 'pre-5G communication systems' are called 'beyond 4G network communication systems' or 'post long-term evolution (LTE) systems.' In order to achieve a high data transmission rate, 5G communication systems are being developed to be implemented in a super-high frequency band (millimeter wave (mmWave)), e.g., a band of 60 GHz. In order to reduce the occurrence of stray electric waves in such a super-high frequency band and to increase a transmission distance of electric waves in 5G communication systems, various technologies are being studied, for example: beamforming, massive multiple input multiple output (MIMO), full dimensional MIMO (FD-MIMO), array antennas, analog beam-forming, and large scale antennas. In order to improve system networks for 5G communication systems, various technologies have been developed, e.g., evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid modulation of frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed configurations, such as objects, exchange information with each other to process the information. Internet of everything (IoE) technology is being newly provided, in which technology related to the IoT is combined with, for example, technology for processing big data through connection with a cloud server. In order to implement the IoT, various technical components are required, such as, sensing technology, wired/wireless communication and network infrastructures, service interfacing technology, security technology, etc. In recent years, technology including a sensor network for connecting objects, machine to machine (M2M) communication, machine type communication (MTC), etc. have been studied. In the IoT environment, intelligent internet technology (IT) services may be provided to collect and analyze data obtained from objects connected to each other and thus to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are implemented by using 5G communication technology including beam-forming, MIMO, array antenna, etc. The application of the cloud RAN as a big data processing technique described above may be an example of convergence of the 5G communication technology and the IoT technology.

As described above, with the development of wireless communication systems, various services are now providable, and thus, a way of smoothly providing these services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus is a communication method for efficiently performing cell selection or transmission and reception of data or information in a mobile communication system.

Additional aspects will be set forth in part in the description which follows and, in part, will be apparent from the description, or may be learned by practice of the presented embodiments of the disclosure.

In accordance with an aspect of the disclosure, a method of performing cell selection, by a terminal, in a wireless communication system is provided. The method includes receiving a control message including configuration information for a radio resource control (RRC) inactive state, entering the RRC inactive state based on the configuration information, performing cell selection, and in response to a suitable cell not being found and an acceptable cell being found in the cell selection, entering a RRC idle state.

The performing of the cell selection may include performing a cell selection process to find the suitable cell and in response to the cell selection process failing to find the suitable cell, searching for the acceptable cell.

The method may further include discarding context information of the terminal in the RRC idle state.

The method may further include stopping a radio access network-based notification area (RNA) update in the RRC idle state.

In accordance with another aspect of the disclosure, a method of performing cell selection, by a base station, in a wireless communication system is provided. The method includes determining configuration information for a radio resource control (RRC) inactive state; and transmitting a control message including the configuration information to a terminal, wherein the terminal enters the RRC inactive state based on the configuration information, and wherein in response to a suitable cell not being found and an acceptable cell being found, the terminal enters a RRC idle state.

Context information of the terminal may be discarded in the RRC idle state.

A radio access network-based notification area (RNA) update may be stopped in the RRC idle state.

In accordance with another aspect of the disclosure, a terminal for performing cell selection in a wireless communication system is provided. The terminal includes a transceiver; and a processor coupled with the transceiver and configured to: control the transceiver to receive a control message including configuration information for a radio resource control (RRC) inactive state, enter the RRC inactive state based on the configuration information, perform cell selection, and in response to a suitable cell not being found and an acceptable cell being found in the cell selection, enter a RRC idle state.

The processor may be further configured to perform a cell selection process to find the suitable cell, and in response to the cell selection process failing to find the suitable cell, search for the acceptable cell.

The processor may be further configured to discard context information of the terminal in the RRC idle state.

The processor may be further configured to stop a radio access network-based notification area (RNA) update in the RRC idle state.

In accordance with another aspect of the disclosure, a base station for performing cell selection in a wireless communication system is provided. The base station includes a transceiver; and a processor coupled with the transceiver and configured to: determine configuration information for a radio resource control (RRC) inactive state, and control the transceiver to transmit a control message including the configuration information to a terminal, wherein the terminal enters the RRC inactive state based on the configuration information, and wherein in response to a suitable cell not being found and an acceptable cell being found, the terminal enters a RRC idle state.

Context information of the terminal may be discarded in the RRC idle state.

A radio access network-based notification area (RNA) update may be stopped in the RRC idle state.

According to another embodiment of the disclosure, a non-transitory computer-readable recording medium has recorded thereon a program for executing the method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Throughout the disclosure, the expression "at least one of a, b or c" indicates only a, only b, only c, both a and b, both a and c, both b and c, all of a, b, and c, or variations thereof.

FIGS. 1A through 3F, discussed below, and the various embodiments used to describe the principles of the disclosure in this patent document are by way of illustration only and should not be construed in any way that would limit the scope of the disclosure. Those skilled in the art will understand that the principles of the disclosure may be implemented in any suitably arranged communications system. The terms used to describe various embodiments are exemplary. It should be understood that these are provided to merely aid the understanding of the description, and that their use and definitions in no way limit the scope of the disclosure. Terms first, second, and the like are used to differentiate between objects having the same terminology and are in no way intended to represent a chronological order, unless where explicitly stated otherwise. A set is defined as a non-empty set including at least one element.

Figure 1A:
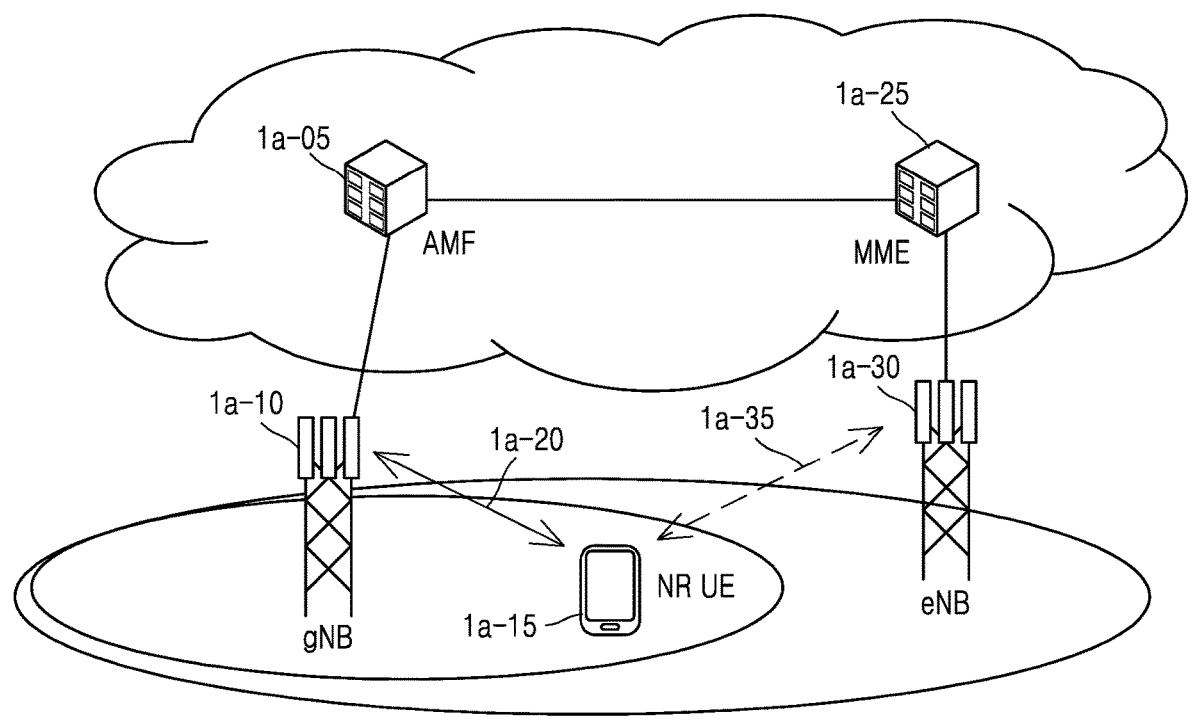
FIG. 1A is a diagram of a configuration of a next generation mobile communication system, according an embodiment of the disclosure.

FIG. 1A is a diagram of a configuration of a next generation mobile communication system, according an embodiment of the disclosure.

Referring to FIG. 1A, a wireless access network of the next generation mobile communication system (hereinafter, a new radio (NR) system) may be configured as a new radio core network including a new radio node B (gNB) 1a-10 and an access and mobility management function (AMF) 1a-05. A new radio user equipment (hereinafter, NR UE or UE) 1a-15 may access an external network through the gNB 1a-10 and the AMF 1a-05.

In FIG. 1A, the gNB 1a-10 may correspond to an evolved node B (eNB) of an existing long-term evolution (LTE) system. The gNB 1a-10 is connected to the NR UE 1a-15 via a wireless channel 1a-20 and may provide a service superior to an existing node B. In the NR system, because all user traffic is serviced via a shared channel, an apparatus that performs scheduling by gathering pieces of state information, such as information about buffer states, available transmit power states, channel states, etc. of UEs is employed, and the gNB 1a-10 may operate as such an apparatus. One gNB 1a-10 may generally control a plurality of cells. A bandwidth greater than the existing maximum bandwidth may be given to achieve high speed data transmission compared to the existing LTE system, and beam-forming technology may be added to wireless access technology such as orthogonal frequency division multiplexing (OFDM). Also, an adaptive modulation & coding (AMC) technique in which a modulation scheme and a channel coding rate are determined according to a channel state of a UE may be applied. The AMF 1a-05 may perform functions of supporting mobility, setting a bearer, setting a quality of service (QoS), etc. The AMF 1a-05 is an apparatus configured to perform not only a mobility management function but also various control functions with respect to the UE, and may be connected to a plurality of base stations. In addition, the NR system may interoperate with the existing LTE system, and the AMF a1-05 may be connected to a mobility management entity (MME) 1a-25 via a network interface. The MME 1a-25 may be connected to eNB 1a-30 that is an existing base station. A UE supporting LTE-NR dual connectivity may transmit or receive data while maintaining connection to not only the gNB 1a-10 via wireless channel 1a-20 but also the eNB 1a-30 wireless channel 1a-35.

Figure 1B:
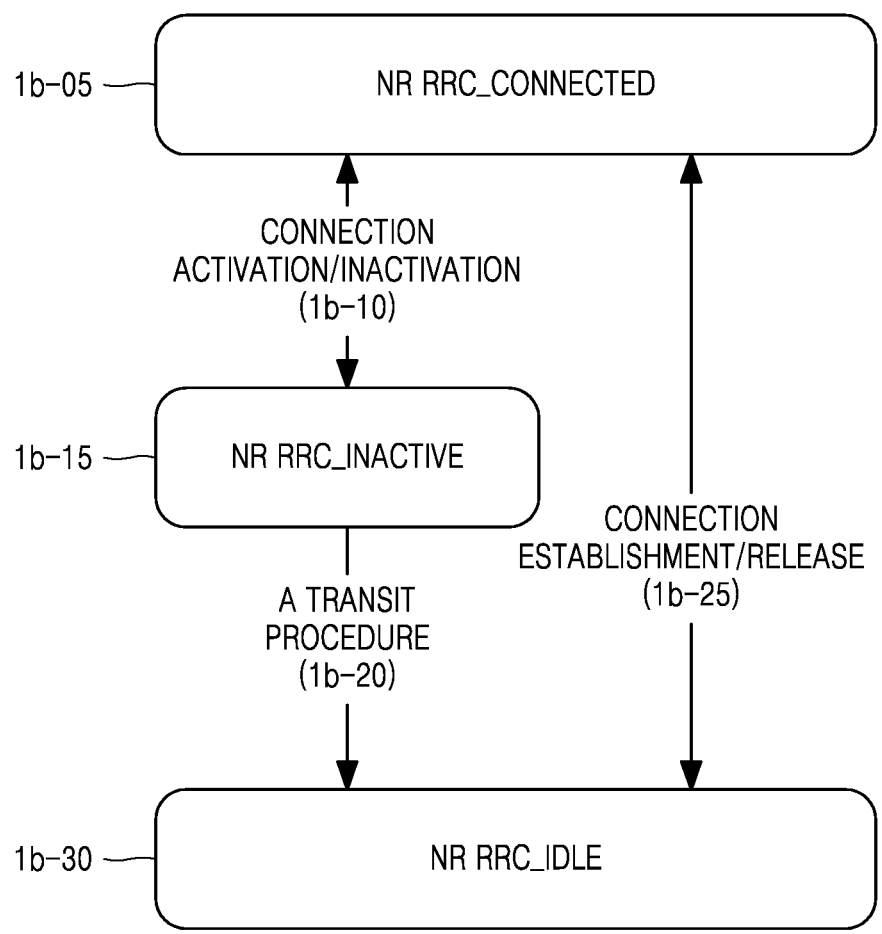
FIG. 1B is a diagram for describing a transition of a wireless connection state in the next generation mobile communication system, according to an embodiment of the disclosure.

FIG. 1B is a diagram for describing a transition of a wireless connection state in the NR system, according an embodiment of the disclosure.

The NR system has three types of wireless connection states (radio resource control (RRC) states). A connection mode (RRC_CONNECTED) 1b-05 is a wireless connection state in which a UE is able to transmit or receive data. An idle mode (RRC_IDLE) 1b-30 is a wireless connection mode in which a UE monitors whether any paging message is transmitted to the UE. These two modes are wireless connection states that are also applied to an existing LTE system, and detailed technologies are the same as those of the existing LTE system. In the NR system, an inactive wireless connection state (RRC_INACTIVE) 1b-15 is newly defined. In the wireless connection state, user equipment (UE) context is maintained in a base station and a UE, and radio access network (RAN) based paging may be supported. Features of the RRC_INACTIVE 1b-15 are as follows:

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN; and
NR RAN knows the RAN-based notification area which the UE belongs to.

A UE in the RRC_INACTIVE 1b-15 performs the following operations:

RAN paging monitoring;
CN paging monitoring;
RNA update upon cell reselection to the cell not belonging to the current RNA; and
RNA update upon RNA periodic timer expiry.

The RRC_INACTVE 1b-15 mode may transition from the RRC_CONNECTED 1b-05 mode or RRC_IDLE 1b-30 mode by using a certain procedure. The RRC_INACTVE 1b-15 mode may transition to the RRC_CONNECTED 1b-05 mode according to connection activation, or the RRC_CONNECTED 1b-05 mode may transition to the RRC_INACTIVE 1b-15 mode according to connection inactivation in operation 1b-10. In the connection activation or inactivation, at least one RRC message is transmitted or received between a UE and a base station, and at least one operation is provided. The RRC_INACTIVE 1b-15 mode may transition to the RRC_IDLE 1b-30 mode according to a certain procedure in operation 1b-20. As the certain procedure mentioned above, various methods, such as a certain message exchange method, a timer-based or event-based method, etc. may be considered. Transition between the RRC_CONNECTED 1b-05 mode and the RRC_IDLE 1b-30 mode is performed based on the existing LTE technology. In other words, such transition is performed in operation 1b-25 via connection establishment or release.

Figure 1C:
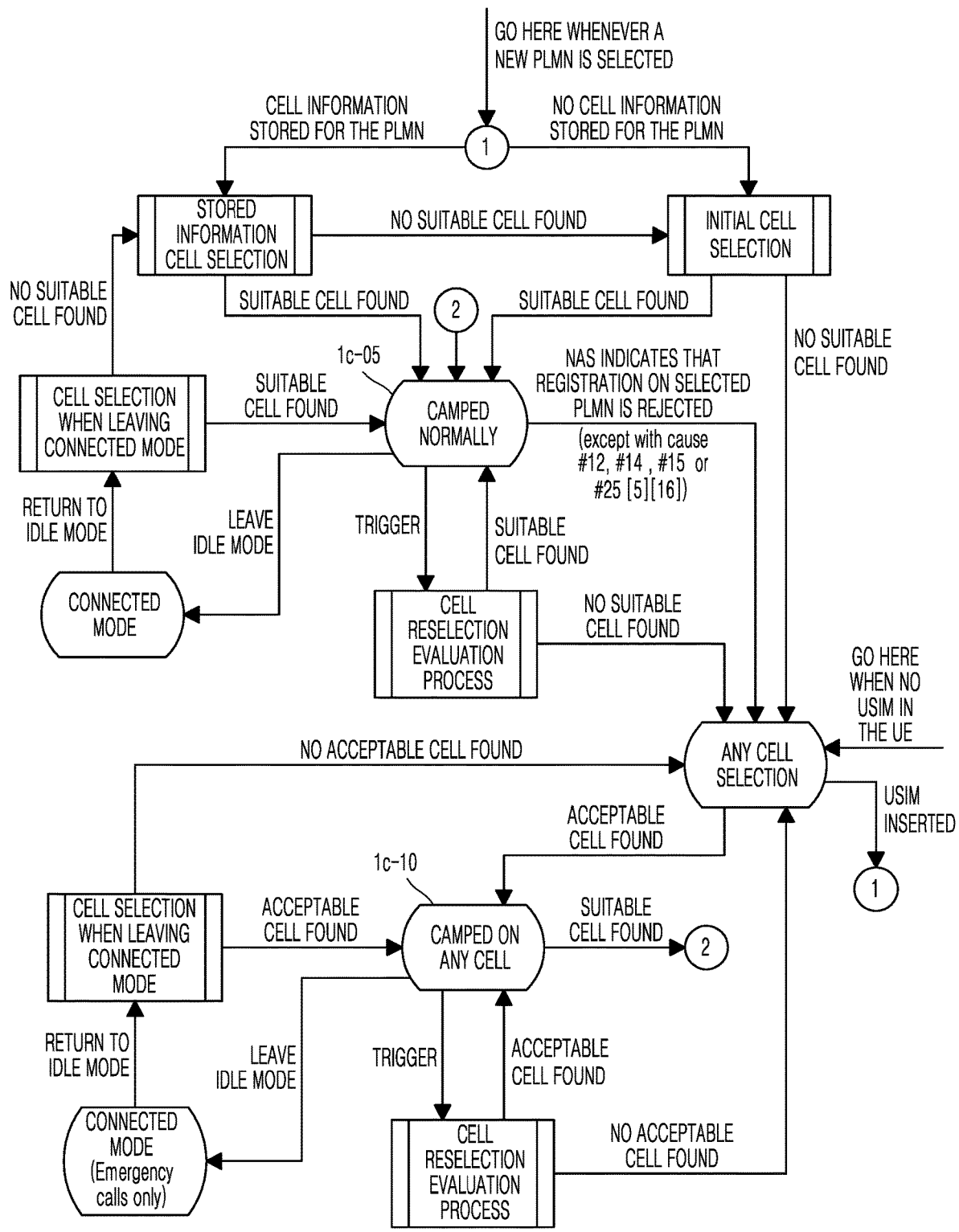
FIG. 1C is a flowchart of a state transition of a user equipment (UE) in an idle mode in a general long-term evolution (LTE) technology, according to an embodiment of the disclosure.

FIG. 1C is a flowchart of a state transition of a UE in an idle mode in a general LTE technology, according an embodiment of the disclosure.

In the general LTE technology, the UE in the idle mode is in one state according to several conditions, and operations of the UE and services provided to the UE may vary based on states. The most important two states are 'camped normally' 1c-05 and 'camped on any cell' 1c-10. When one UE camps on one suitable cell, the UE may be in the 'camped normally' 1c-05. The suitable cell is a cell that satisfies the following conditions.

The cell is part of either:
the selected PLMN, or:
the registered PLMN, or:
a PLMN of the Equivalent PLMN list
For a CSG cell, the cell is a CSG member cell for the UE;
According to the latest information provided by NAS:
The cell is not barred;
The cell is part of at least one TA that is not part of the list of "forbidden tracking areas for roaming", which belongs to a PLMN that fulfils the first bullet above;
The cell selection criteria are fulfilled;
Except for NB-IoT, if the UE supports authorization of coverage enhancements and upper layers indicated that use of coverage enhancements is not authorized for the selected PLMN:
the cell selection criterion S in normal coverage shall be fulfilled;

If more than one PLMN identity is broadcast in the cell, the cell is considered to be part of all TAs with TAIs constructed from the PLMN identities and the TAC broadcast in the cell.

A UE in the 'camped normally' 1c-05 state may receive a general service from a network and perform the following operations:
select and monitor the indicated Paging Channels of the cell according to information sent in system information;
monitor relevant System Information;
perform measurements for the cell reselection evaluation procedure; and
execute the cell reselection evaluation process on the following occasions/triggers:
1) UE internal triggers, so as to meet performance; and
2) When information on the BCCH or BR-BCCH used for the cell reselection evaluation procedure has been modified.

However, when the UE is unable to locate at least one suitable cell, and finds and camps on an acceptable cell, the UE may be in the 'camped on any cell' 1c-10. The acceptable cell is a cell satisfying the following conditions.

The cell is not barred
The cell selection criteria are fulfilled
The UE in the 'camped on any cell' 1c-10 state may receive only limited services, such as emergency call, disaster information reception, etc. from a network, and perform the following operations:
select and monitor the indicated paging channels of the cell;
monitor relevant System Information;
perform measurements for the cell reselection evaluation procedure;
execute the cell reselection evaluation process on the following occasions/triggers:
1) UE internal triggers, so as to meet performance; and
2) When information on the BCCH or BR-BCCH used for the cell reselection evaluation procedure has been modified;
regularly attempt to find a suitable cell trying all frequencies of all RATs that are supported by the UE. If a suitable cell is found, UE shall move to camped normally state; and
if the UE supports voice services and the current cell does not support emergency call as indicated in System information, the UE should perform cell selection/reselection to an acceptable cell of any supported RAT regardless of priorities provided in system information from current cell, if no suitable cell is found.

NOTE 1: The UE is allowed to not perform reselection to an inter-frequency E-UTRAN cell in order to prevent camping on a cell on which it cannot initiate an IMS emergency call.

In the NR system, an inactive mode (RRC_INACTIVE) that is a new RRC state is defined. Operations of the UE in the inactive mode may be very similar to those in an idle mode of LTE. Accordingly, the operations of the UE in the inactive mode are defined with respect to the states. In particular, the disclosure proposes operations of the UE when the UE in the inactive mode is unable to find at least one suitable cell, and so, camps on an acceptable cell.

Figure 1D:
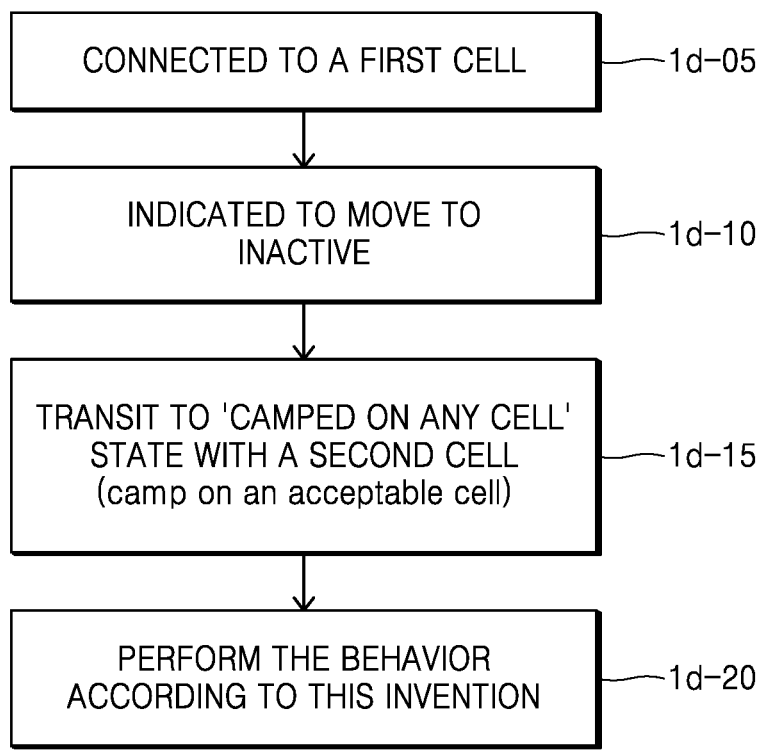
FIG. 1D is a flowchart for describing operations when a UE in an inactive state camps on an acceptable cell, according to an embodiment of the disclosure.

FIG. 1D is a flowchart for describing operations when a UE in an inactive state camps on an acceptable cell, according to an embodiment of the disclosure.

In operation 1d-05, the UE may be connected to a first cell. The first cell is a suitable cell and the UE may receive a general service from the first cell.

In operation 1d-10, the UE is indicated to move to the inactive state.

In operation 1d-15, the UE may be unable to find at least one suitable cell during inter-cell movement to the inactive mode, and so, may camp on a second cell classified as an acceptable cell.

In operation 1d-20, the UE may perform operations according to an embodiment of the disclosure while camping on the second cell.

Figure 1E:
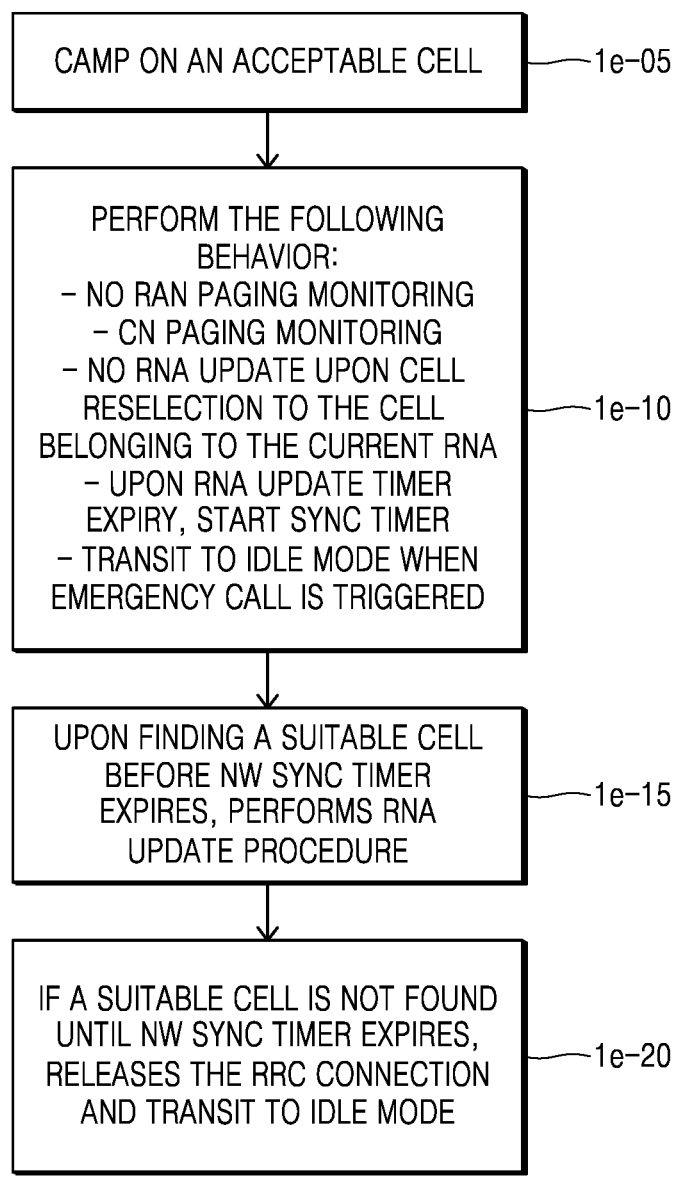
FIG. 1E is a flowchart for describing operations of a UE, according to an embodiment of the disclosure.

FIG. 1E is a flowchart for describing operations of a UE, according to an embodiment of the disclosure.

According to the current embodiment of the disclosure, an inactive mode may be maintained even when the UE in the inactive mode camps on an acceptable cell, and may not perform some of general operations that are performed in the inactive mode. Thus, a RRC state may not be changed when the UE camps on the acceptable cell or moves back to a suitable cell.

In operation 1e-05, the UE in the inactive mode may camp on the acceptable cell.

In operation 1e-10, the UE may maintain the inactive mode and perform the following operations:
No RAN paging monitoring;
CN paging monitoring;
No RNA update upon cell reselection to the cell belonging to the current RNA;
Upon RNA update timer expiry, start NW SYNC timer; and
Transition to IDLE mode when emergency call is triggered.

Values of an RAN notification area (RNA) update timer and NW SYNC timer are set by a network.

When an available access triggered in the acceptable cell, such as in the case of an emergency call, the UE may transition from the current inactive mode to an idle mode, and request the acceptable cell currently camped on for connection establishment.

In operation 1e-15, upon finding a suitable cell before the NW SYNC timer being driven expires, the UE may perform an RNA update procedure with the suitable cell. The RNA update procedure is an operation for notifying a position to a RAN-level network (for example, a base station).

In operation 1e-20, when a suitable cell is not found by the time the NW SYNC timer being driven has expired, the UE may release the RRC connection and transition to an idle mode. When the RRC connection is released, the UE may delete stored context.

There may be a case where the NW SYNC timer is not considered. In this case, the UE may perform the RNA update procedure on the suitable cell when the suitable cell is found before the RNA update timer being driven expires. Also, in operation 1e-20, when a suitable cell is not found by the time the RNA update timer being driven has expired, the UE may release the RRC connection and transition to the idle mode.

When the base station storing the UE context of the UE is unable to recognize the RNA update from the UE by the time a certain period of time after the RNA update timer has expired, the base station may delete the stored UE context.

Figure 1F:
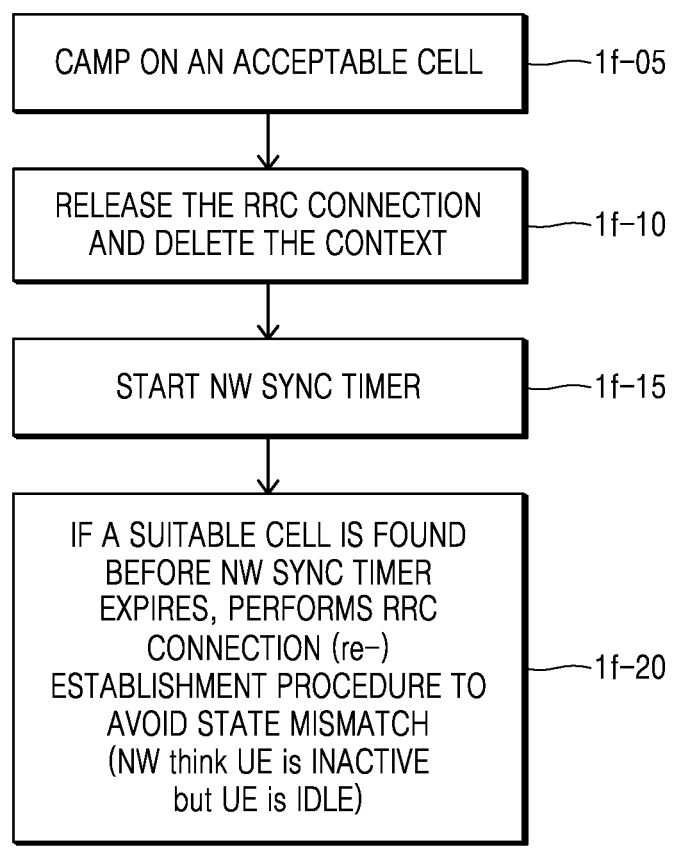
FIG. 1F is a flowchart for describing operations of a UE, according to another embodiment of the disclosure.

FIG. 1F is a flowchart for describing operations of a UE, according to another embodiment of the disclosure.

In the current embodiment of the disclosure, an idle mode may be transitioned to when the UE in an inactive mode camps on an acceptable cell, and the UE may perform operations that were performed in the idle mode. Accordingly, when the UE camps on a suitable cell again, a connection establishment or reestablishment procedure may be performed to indicate that a RRC state is transitioned to the idle mode. When the connection establishment or reestablishment procedure is not performed, RRC state mismatch may occur between a network and the UE.

In operation 1f-05, the UE in the inactive mode may camp on an acceptable cell.

In operation 1f-10, the UE may transition to the idle mode and release the RRC connection. Also, the UE may delete stored context.

In operation 1f-15, the UE may start an NW SYNC timer.

In operation 1f-20, when a suitable cell is found before the NW SYNC timer expires, the UE may perform a connection establishment or reestablishment procedure to indicate that the RRC state transitioned to the idle mode.

Figure 1G:
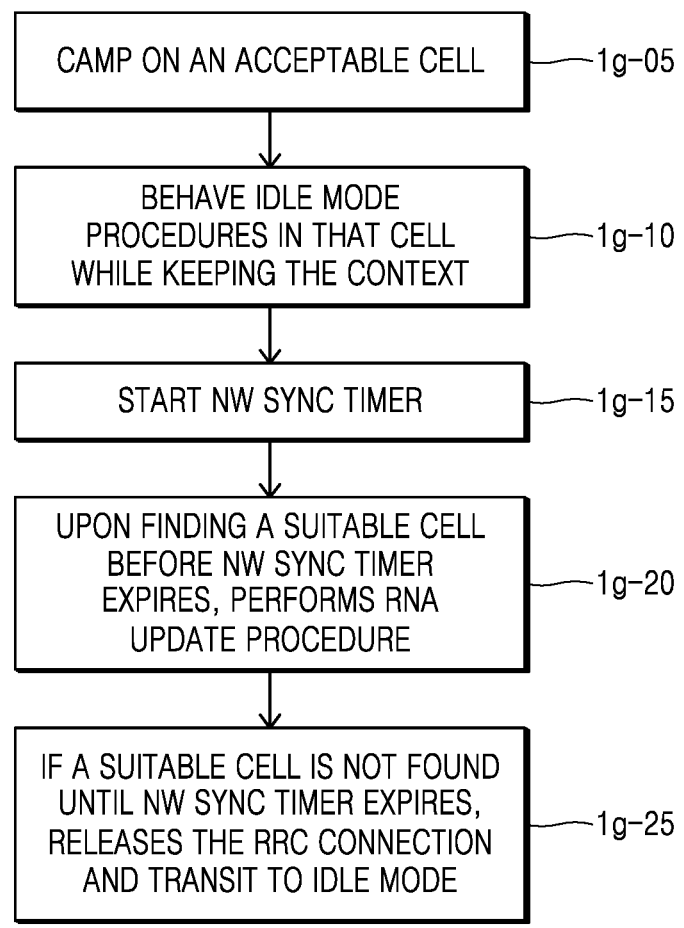
FIG. 1G is a flowchart for describing operations of a UE, according to another embodiment of the disclosure.

FIG. 1G is a flowchart for describing operations of a UE, according to another embodiment of the disclosure.

In the current embodiment of the disclosure, an idle mode is transitioned to when the UE in an inactive mode camps on an acceptable cell, and operations that were performed in the idle mode are performed. Meanwhile, a RRC state may also transition to the inactive mode again when the UE camps on a suitable cell again.

In operation 1g-05, the UE in the inactive mode may camp on the acceptable cell.

In operation 1g-10, the UE may transition to the idle mode and perform idle mode operations while maintaining stored context.

In operation 1g-15, the UE may start an NW SYNC timer.

In operation 1g-20, upon finding a suitable cell before the NW SYNC timer expires, the UE may perform an RNA update procedure on the suitable cell. The RNA update procedure is an operation for notifying a position to a RAN-level network (for example, a base station).

In operation 1g-25, when a suitable cell is not found by the time the NW SYNC timer expires, the UE may release RRC connection and transition to the idle mode. When the RRC connection is released, the UE may delete stored context.

Figure 2A:
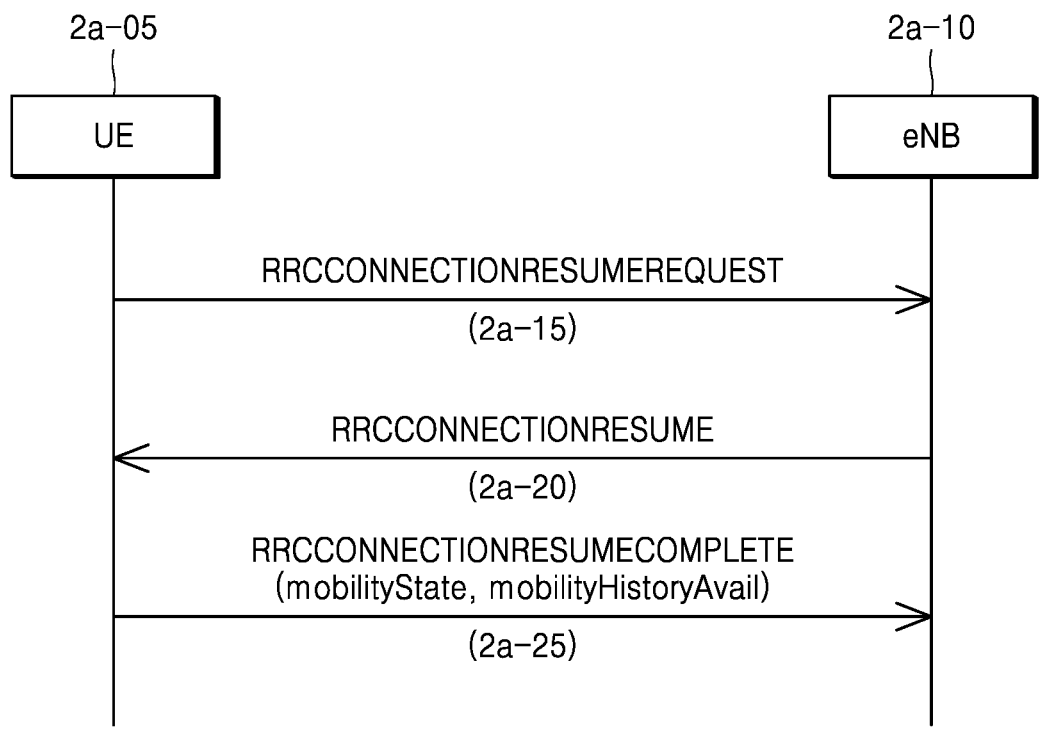
FIG. 2A is a flowchart for describing processes of reporting UE mobility speed information in a general LTE technology.

FIG. 2A is a flowchart for describing processes of reporting mobility speed information of a UE in a general LTE technology.

When the mobility speed information of the UE in an idle mode is known to a network with respect to the UE transiting from the idle mode to a connection mode, the network may easily configure cell measurement setting information, such as a3 offset, time-to-trigger (TTT), etc. Accordingly, the general LTE technology has been improved such that a mobility speed of the UE when the UE transitioned to the connection mode is reported via a RRC connection setup complete message and a RRC connection resume complete message. For example, a UE 2a-05 in a light connected mode may trigger connection setup by using a RRC connection resume request message 2a-15. An eNB 2a-10 may transmit a RRC connection resume message 2a-20 in response to the RRC connection resume request message 2a-15. Upon successfully receiving the RRC connection resume message 2a-20, the UE 2a-05 transmits a RRC connection resume complete message 2a-25 to the eNB 2a-10, and the RRC connection resume complete message 2a-25 includes mobilityState and mobilityHistoryAvail fields, which are UE mobility speed information. The mobilityState field may indicate the mobility speed of the UE 2a-05 in 3 stages, according to a certain rule. The mobilityHistoryAvail field may be used to support an operation of the UE 2a-05 reporting the information and to indicate inclusion of available mobility speed information.

RRCConnectionResumeComplete Message

```
-- ASN1START
RRCConnectionResumeComplete-r13 ::= SEQUENCE {
    rrc-TransactionIdentifier    RRC-TransactionIdentifier,
    criticalExtensions           CHOICE {
        rrcConnectionResumeComplete-r13    RRCConnectionResumeComplete-r13-IEs,
        criticalExtensionsFuture    SEQUENCE { }
    }
}
RRCConnectionResumeComplete-r13-IEs ::= SEQUENCE {
    selectedPLMN-Identity-r13    INTEGER (1..maxPLMN-r11)    OPTIONAL,
    dedicatedInfoNAS-r13    DedicatedInfoNAS        OPTIONAL,
    rlf-InfoAvailable-r13    ENUMERATED {true}        OPTIONAL,
    logMeasAvailable-r13    ENUMERATED {true}        OPTIONAL,
    connEstFailInfoAvailable-r13 ENUMERATED {true}        OPTIONAL,
    mobilityState-r13              ENUMERATED {normal,medium,high,spare} OPTIONAL,
    mobilityHistoryAvail-r13    ENUMERATED {true}        OPTIONAL,
    logMeasAvailableMBSFN-r13    ENUMERATED {true}        OPTIONAL,
    lateNonCriticalExtension    OCTET STRING        OPTIONAL,
```

```
    nonCriticalExtension    SEQUENCE { }       OPTIONAL
}
-- ASN1STOP
```

Figure 2B:
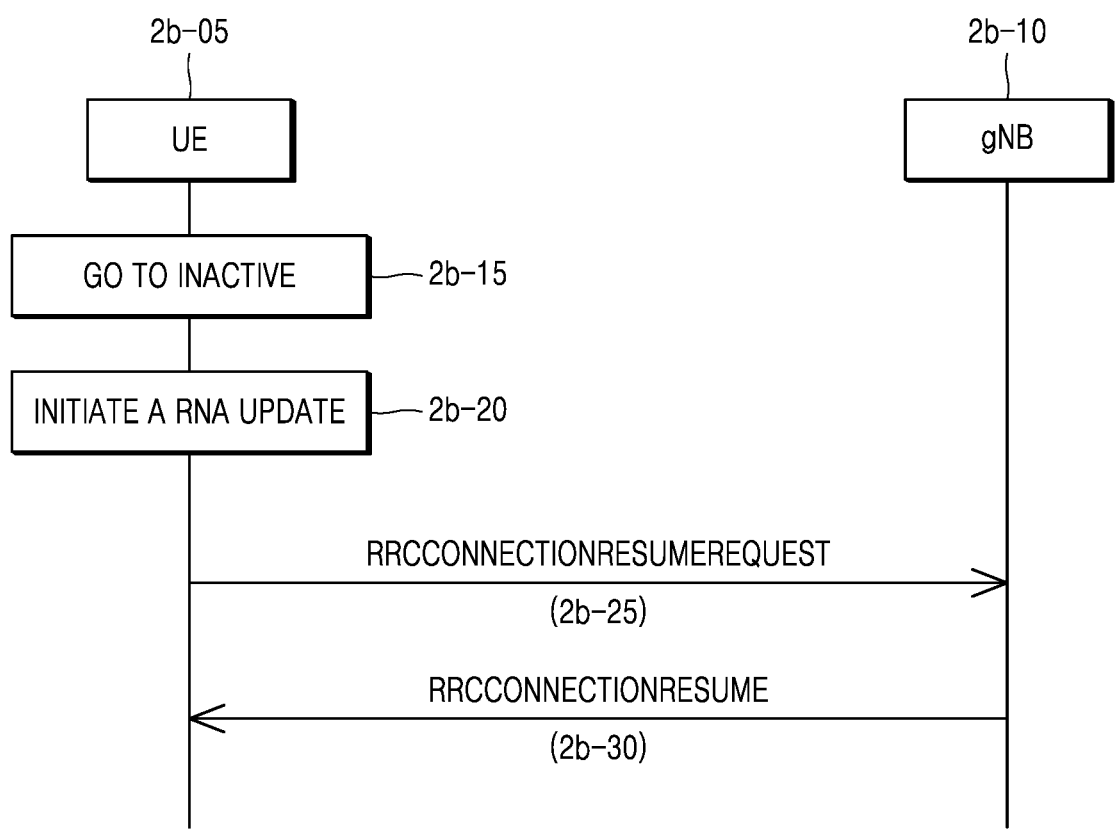
FIG. 2B is a flowchart for describing processes of reporting UE mobility speed information during a radio access network (RAN) notification area (RNA) update procedure, according to an embodiment of the disclosure.

FIG. 2B is a flowchart for describing processes of reporting mobility speed information of a UE during an RNA update procedure, according to an embodiment of the disclosure.

In the NR system, it may also be useful to provide mobility speed information of a UE during transition to a connection mode as in the general LTE system. A difference from the general LTE system is that in the NR system, an inactive mode (RRC_Inactive) that is a new RRC state is defined and a RNA concept is introduced to the inactive mode. In the inactive mode, a base station may generate paging. Thus, the generated paging may be transmitted within a group of certain cells. Accordingly, when the UE moves a region including the cells to another region, a paging generated by the base station is received only when the movement is reported to the base station belonging to the new region. This is similar to the tracking area update in the general LTE system, except that only the base station participates without participation of a core network.

In the disclosure, a UE 2b-05 in the NR system may report mobility speed information in an inactive mode during transition from the inactive mode to a connection mode in operation 2b-15. When RNA update of 2b-20 is a target, a connection setup procedure may be performed in two stages of RRC connection resume request (operation 2b-25) and RRC connection resume (operation 2b-30) instead of three stages of RRC connection resume request, RRC connection resume, and RRC connection resume complete, and then the connection mode may be transitioned back to the inactive mode. Here, it is not possible to include the mobility speed information in a RRC connection resume complete message as in the general LTE system. Thus, in the current embodiment of the disclosure, the UE 2b-05 in the inactive mode may include one indicator in a resume request message that is the first RRC message transmitted to a gNB 2b-10 for connection setup. The first indicator may be included in the resume request message when the resume request message is transmitted for the UE 2b-05 to perform the RNA update and when a mobility speed of the UE 2b-05 is high (or when the mobility speed is different from that reported before). The first indicator may be used to support an operation of the UE 2b-05 reporting information and indicate that valid mobility speed information is included.

Upon receiving the resume request message including the first indicator, the gNB 2b-10 may include a second indicator in a resume message and transmit the resume message to the UE 2b-05 when the mobility speed information of the UE 2b-05 is to be received. The second indicator may be used by the gNB 2b-10 to request the UE 2b-05 for the mobility speed information. In this case, when a target of the resume request message is the RNA update and the gNB 2b-10 sets the second indicator to be False, the gNB 2b-10 may provide new RNA setup information and transition the UE 2b-05 back to the inactive mode. On the other hand, when the target of the resume request message is the RNA update and the gNB 2b-10 sets the second indicator to be True, the gNB 2b-10 may not provide new RNA setup information but restart at least SRB1 and SRB2 with respect to the UE 2b-05.

Upon receiving the resume message including the second indicator, the UE 2b-05 varies operations based on a value of an indicator. When the second indicator is False, the UE 2b-05 may be immediately transitioned back to the insert mode. On the other hand, when the second indicator is True, the UE 2b-05 may restart SRB and configure a resume complete message to SRB1. The resume complete message may include the mobility speed information of the UE 2b-05. The mobility speed information may include a mobilityState field indicating the moving speed of the UE 2b-05 to be three stages, mobiltiyHistoryReport field including time information about how long the UE 2b-05 stayed in each cell, etc.

Figure 2C:
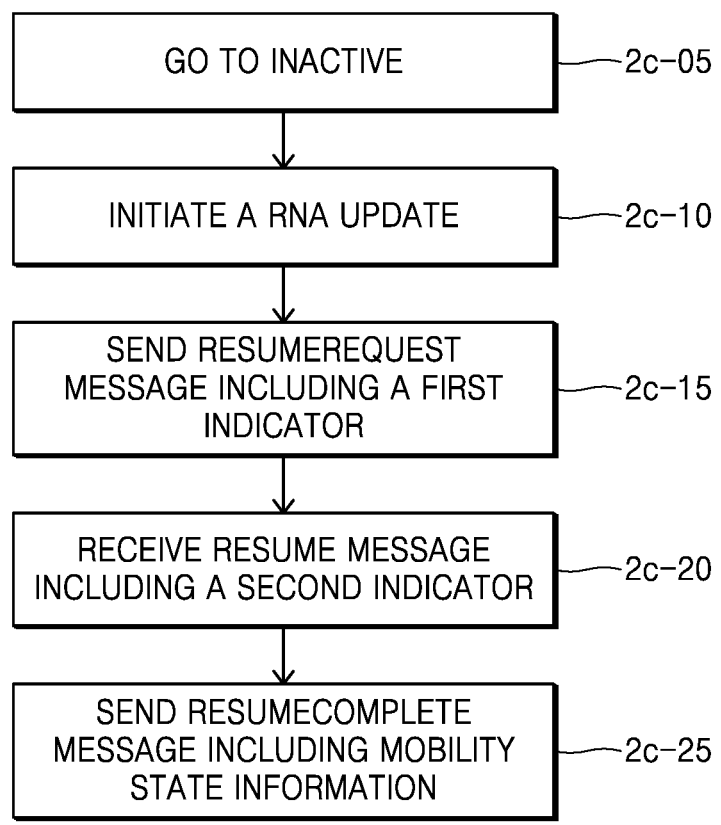
FIG. 2C is a flowchart for describing operations of a UE, according to another embodiment of the disclosure.

FIG. 2C is a flowchart for describing operations of a UE, according to another embodiment of the disclosure.

In operation 2c-05, the UE may transition to an inactive mode.

In operation 2c-10, the UE may trigger an RNA update procedure when a certain condition is satisfied. The certain condition may be expiration of a certain timer that starts or restarts whenever the UE performs an RNA update procedure or entrance of the UE to another RAN area.

In operation 2c-15, the UE may transmit a resume request message including a first indicator to a base station. The first indicator may be included in the resume request message when the UE transmits the resume request message to perform the RNA update procedure and when a mobility speed of the UE is high (or when the mobility speed is different from that reported before). The first indicator may be used to support an operation of the UE reporting information and indicate that valid mobility speed information is included.

In operation 2c-20, the UE may receive a resume message including a second indicator from the base station. The second indicator may be used by the base station to request the UE for the mobility speed information.

In operation 2c-25, when the second indicator is set as True, the UE may restart SRB1 and transmit a resume complete message to the base station. The resume complete message may include the mobility speed information. The mobility speed information may include a mobilityState field indicating the moving speed of the UE to be three stages, mobiltiyHistoryReport field including time information about how long the UE stayed in each cell, etc.

Figure 2D:
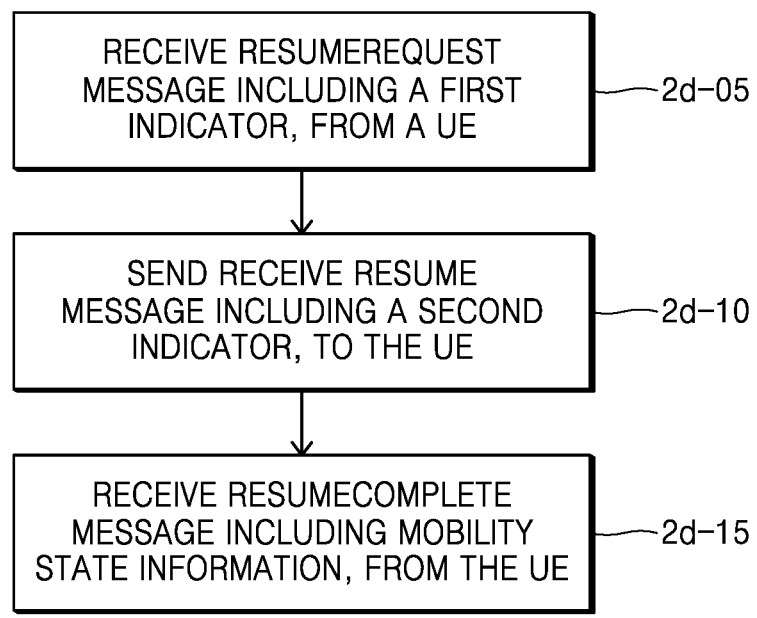
FIG. 2D is a flowchart for describing operations of a base station, according to an embodiment of the disclosure.

FIG. 2D is a flowchart for describing operations of a base station, according to an embodiment of the disclosure.

In operation 2d-05, the base station may receive a resume request message including a first indicator from a certain UE. Then, the base station may determine that a target of the resume request message is an RNA update procedure.

In operation 2d-10, when the base station wishes to receive mobility speed information from the UE, the base station may include a second indicator in a resume message after setting the second indicator as True, and transmit the resume message to the UE. When the second indicator is set as True, the base station may not provide new RNA setup information and restart at least SRB1 with respect to the UE.

In operation 2d-15, the base station may receive a resume complete message including mobility speed information from the UE.

Figure 3A:
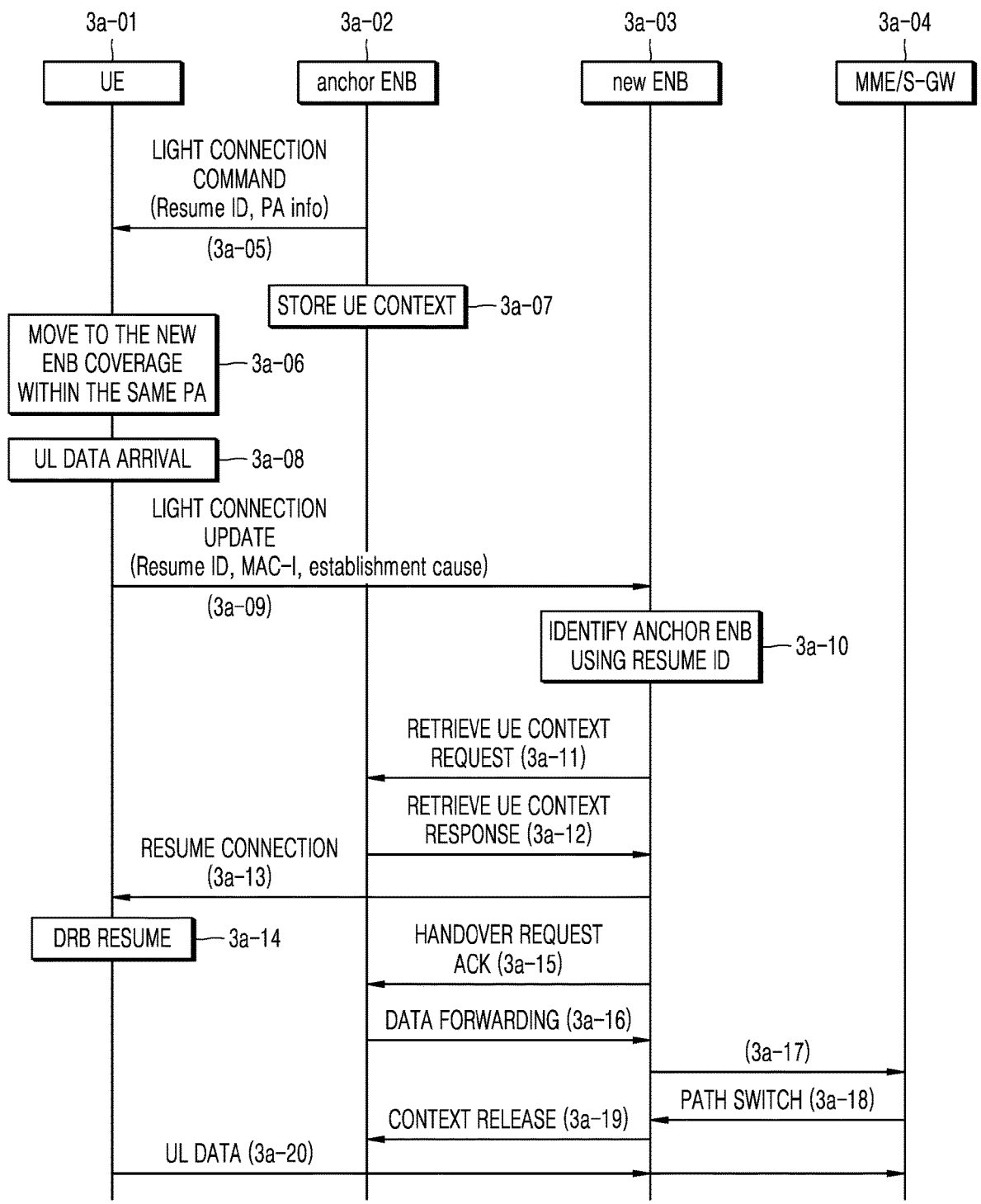
FIG. 3A is a diagram for describing processes of transmitting mobile-originated (MO) data to a UE, according to an embodiment of the disclosure.

FIG. 3A is a diagram for describing processes of transmitting mobile-originated (MO) data to a UE, according to an embodiment of the disclosure.

A UE 3a-01 connected to an anchor eNB 3a-02 may receive a light connection command from the anchor eNB 3a-02 in operation 3a-05. Upon receiving the light connection command, the UE 3a-01 may transition to a light connected mode. The anchor eNB 3a-02 may store context of the UE 3a-01, in operation 3a-07. The UE 3a-01 may move to a new eNB 3a-03 within a same paging area (PA), in operation 3a-06. MO data to be transmitted by the UE (UL data) 3a-01 may be generated in operation 3a-08. At this time, the UE 3a-01 may move to transmit a light connection update message to the new eNB 3a-03 instead of the anchor eNB 3a-02, in operation 3a-09. The light connection update message may include at least one of resume ID, MAC-I, or establishment cause. Upon receiving the light connection update message, the new eNB 3a-03 identifies the anchor eNB 3a-02 by using the resume ID, in operation 3a-10. The resume ID may include a combination of a UE ID and a cell (or eNB) ID. Thus, the anchor eNB 3a-02 may request the context of the UE 3a-01, in operations 3a-11 and 3a-12. The new eNB 3a-03 may transmit a resume connection message to the UE 3a-01 in operation 3a-13. Upon receiving the resume connection message, the UE 3a-01 may resume a data radio bearer (DRB) in operation 3a-14 and transmit the MO data. Upon transmitting the resume connection message, the new eNB 3a-03 transmits a handover request acknowledgement (ACK) message to the anchor eNB 3a-02 in operation 3a-15, and the anchor eNB 3a-02 may forward data when there is any in operation 3a-16. Because the UE 3a-01 is not in a service area of the anchor eNB 3a-02, the new eNB 3a-03 that transmitted the resume connection message is considered as a new anchor eNB. Accordingly, the new eNB 3a-03 that transmitted the resume connection message may request an MME/S-GW 3a-04 for path switching in operations 3a-17 and 3a-18, and request the anchor eNB 3a-02 for context release in operation 3a-19. The UE 3a-01 may transmit uplink data to the MME/S-GW 3a-04 through the new eNB 3-c03 in operation 3a-20.

Figure 3B:
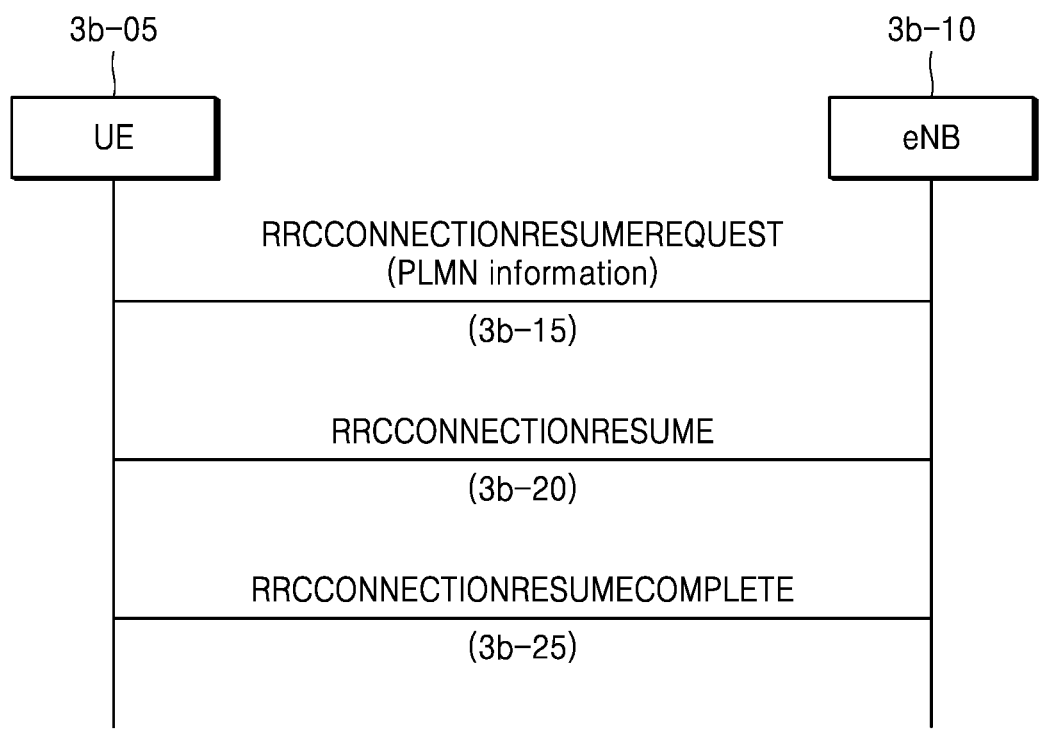
FIG. 3B is a flowchart for describing processes of a UE reporting public land mobile network (PLMN) information during a connection resume process, according to an embodiment of the disclosure.

FIG. 3B is a flowchart for describing processes of a UE 3b-05 reporting public land mobile network (PLMN) information during a connection resume process, according to an embodiment of the disclosure.

Shared networks denote that a plurality of carriers share and use one mobile communication network. The shared networks are advantageous in that initial communication network construction costs may be reduced as a region unable to be covered by its own network is covered by using a network of another carrier. The general LTE technology has been also developed to smoothly support such shared networks. However, the NR system introduced an inactive mode (RRC_Inactive) that is a new RRC state. Context of the UE 3b-05 in the inactive mode is stored in a certain cell or eNB. The UE 3b-05 may leave the certain cell or base station and move to another cell or eNB 3b-10. At a certain point of time, the cell or eNB 3b-10 should request and obtain the context from the certain cell or base station storing the context. The certain point of time is, for example, when the UE 3b-05 in the inactive mode transits to a connection mode. During the transition, a RRC connection resume request message (operation 3b-15) of the UE 3b-05 may include information about the certain cell or eNB storing the context of the UE 3b-05 such that the cell or eNB 3b-10 currently camped on is able to obtain the context. The information may include a combination of a UE ID and an eNB/cell ID. In the current embodiment of the disclosure, when two cells or eNBs belong to different carriers and are operated via shared networks, PMLN information may also be included in the RRC connection resume request message to indicate a counter cell or eNB. Also, the size of PLMN ID applied to the general LTE technology is 20 or 24 bytes, and the size is overly large to include the PMLN information in the RRC connection resume request message. In order to reduce an amount of PLMN information, a PMLN list or plmn-IdentityList field included in system information broadcast by a currently camped-on cell may be used. The cell may broadcast the system information after including the PLMN list supported by the cell to the system information. In the case of an LTE cell, a maximum of 6 PLMN IDs are broadcast, and the plmn-IdentityIndex field may be used to indicate a certain PLMN included in the PMLN list. The plmn-IdentityIndex field is defined as follows.

plmn-IdentityIndex

Index of the PLMN across the plmn-IdentityList fields included in SIB1. Value 1 indicates the PLMN listed 1st in the 1st plmn-IdentityList included in SIB1. Value 2 indicates the PLMN listed 2nd in the same plmn-IdentityList, or when no more PLMN are present within the same plmn-IdentityList, then the PLMN listed 1st in the subsequent plmn-IdentityList within the same SIB1 and so on.

The plurality of PLMN IDs are provided so as to support the shared networks. In the current embodiment of the disclosure, instead of including information of a PLMN (registered PLMN) ID supported by a UE in a RRC connection resume request message, an index value indicating one of PLMN IDs may be provided by referring to a PLMN list broadcast by a currently serving cell. For example, when 6 PLMN IDs exist in a PLMN list and a second PLMN ID is a registered public land mobile network (RPLMN) of a UE, an index value of '2' may be included in a RRC connection resume request message instead of the PLMN ID. Here, the RPLMN of the UE may not exist in the PLMN list broadcast by a currently camped on cell. In this case, a pre-determined index value (for example, the highest index value) in the PLMN list being broadcast, or a value of the PLMN ID may be stored without processing or a part of the PLMN ID may be included in a RRC connection resume request message. For example, in a PLMN, because a first digit includes a country code, a carrier code, and PLMN information within a carrier, only partial information including a part of the carrier code and the PLMN information within the carrier may be stored excluding the country code.

When a pre-determined index value is applied, because the index value does not indicate an actual RPLMN of a UE, an eNB is unable to use the RPLMN. Thus, the eNB may transmit a message requesting the UE for an accurate value of an RPLMN ID when it is determined that the index value is not for an RPLMN. In response to the RRC connection resume request message, the eNB 3b-10 may transmit a RRC connection resume message to the UE 3b-05. (3b-20) The UE 3b-05 may transmit a RRC connection resume complete message according to reception of the RRC connection resume message (3b-25).

Figure 3C:
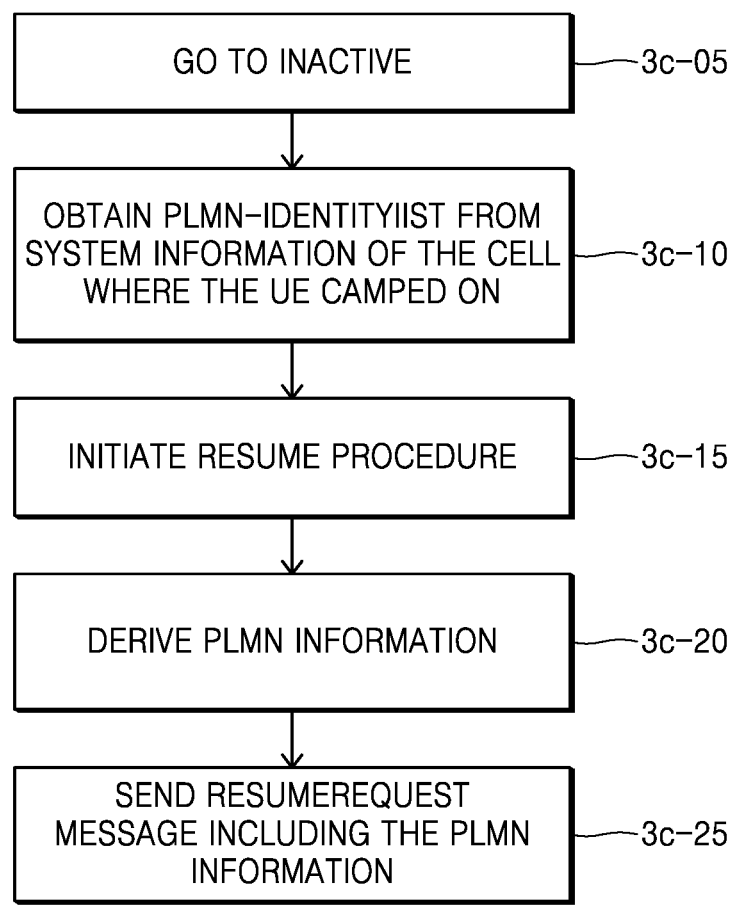
FIG. 3C is a flowchart for describing operations of a UE, according to another embodiment of the disclosure.

FIG. 3C is a flowchart for describing operations of a UE, according to another embodiment of the disclosure.

In operation 3c-05, the UE may transition to an inactive mode.

In operation 3c-10, the UE may obtain plmn-IdentityList broadcast by a cell where the UE is camped on, and when the camped on cell is changed, plmn-IdentityList may be updated.

In operation 3c-15, the UE may initiate a resume procedure.

In operation 3c-20, the UE may derive PLMN information to be included in a resume request message. When an RPLMN of the UE is one of PLMNs included in plmn-IdentityList, an index value indicating the RPLMN may be included in the resume request message. Otherwise a predetermined index value (for example, the highest index value) may be included, or a value of a PLMN ID may be stored without processing or only a part of the PLMN ID may be stored.

Alternatively, when an RPLMN of the UE matches the first PLMN stored in plmn_IdentityList, it is not required to derive the PLMN information and store the PLMN information in the resume request message. When there is no PLMN information, a base station may consider that the RPLMN of the UE matches the first PLMN stored in plmn-IdentityList.

In operation 3c-25, the UE may include the derived PLMN information in the resume request message and transmit the resume request message to the base station.

Figure 3D:
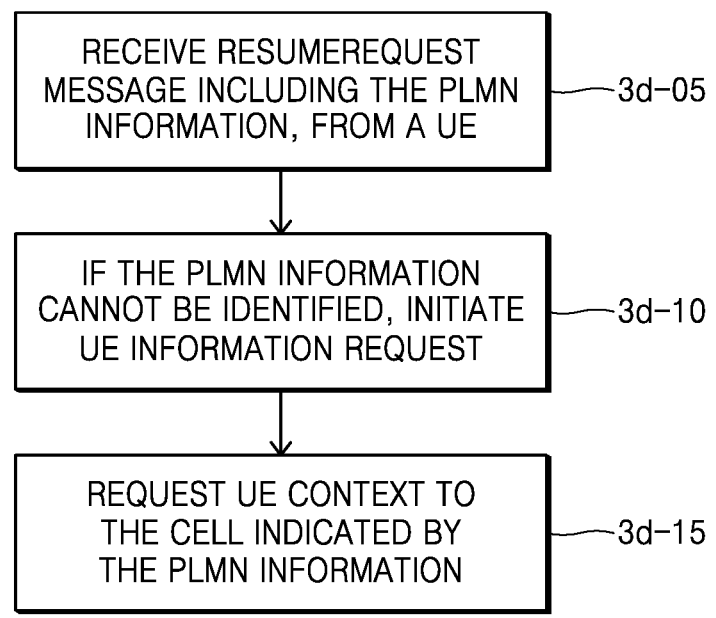
FIG. 3D is a flowchart for describing operations of a base station, according to another embodiment of the disclosure.

FIG. 3D is a flowchart for describing operations of a base station, according to another embodiment of the disclosure.

In operation 3d-05, the base station may receive a resume request message including PLMN information from a certain UE.

In operation 3d-10, when it is determined that the PLMN information included in the resume request message is not an RPLMN value of the UE, the base station may transmit a message requesting an accurate value of the RPLMN ID to the UE. When there is no PLMN information, the base station may consider that RPLMN of the UE matches the first PLMN stored in plmn-IdentityList.

In operation 3d-15, the base station may request UE context from a cell belonging to PLMN indicated by the PLMN information.

Figure 3E:
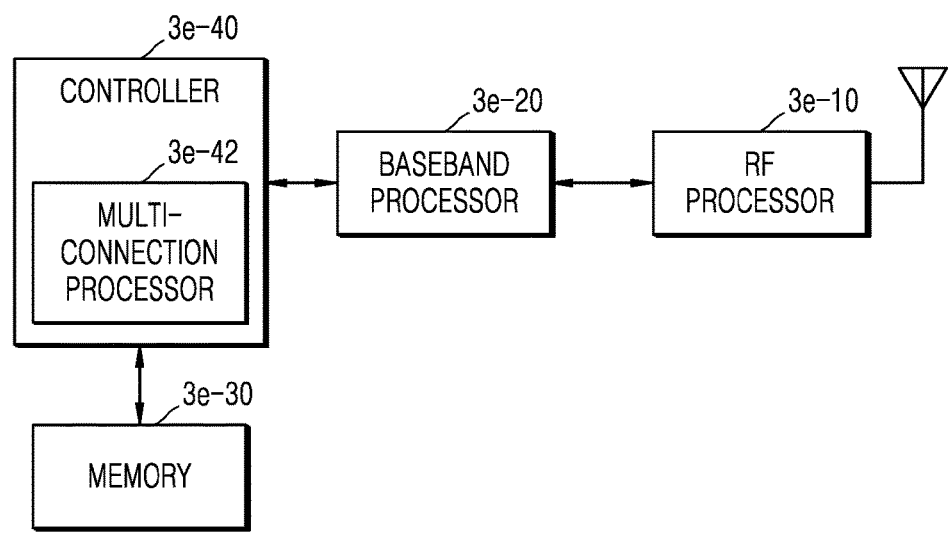
FIG. 3E is a block diagram of a UE according to an embodiment of the disclosure.

FIG. 3E is a block diagram of a UE according to an embodiment of the disclosure.

Referring to FIG. 3E, the UE may include a radio frequency (RF) processor 3e-10, a baseband processor 3e-20, a memory 3e-30, and a controller 3e-40.

The RF processor 3e-10 may perform functions for transmitting or receiving a signal via a radio channel, such as band conversion or signal amplification. In other words, the RF processor 3e-10 may up-convert a baseband signal provided from the baseband processor 3e-20 to an RF band signal and then transmit the RF band signal through an antenna, and may down-convert an RF band signal received through the antenna to a baseband signal. For example, the RF processor 3e-10 may include a transmission filter, a reception filter, an amplifier, a mixer, an oscillator, a digital-to-analog converter (DAC), an analog-to-digital converter (ADC), etc. In FIG. 3e, only one antenna is illustrated, but the UE may include a plurality of antennas. Also, the RF processor 3e-10 may include a plurality of RF changes. In addition, the RF processor 3e-10 may perform beamforming. For the beamforming, the RF processor 3e-10 may adjust a phase and size of each of signals transmitted or received through the plurality of antennas or antenna elements. Also, the RF processor 3e-10 may perform multiple input multiple output (MIMO) and may receive a plurality of layers during MIMO.

The baseband processor 3e-20 may perform a converting function between a baseband signal and a bit string based on a physical layer standard of a system. For example, during data transmission, the baseband processor 3e-20 may generate complex symbols by encoding and modulating a transmission bit string. Also, during data reception, the baseband processor 3e-20 may restore a reception bit string by demodulating and decoding a baseband signal provided from the RF processor 3e-10. For example, according to an orthogonal frequency division multiplexing (OFDM) method, during data transmission, the baseband processor 3e-20 may generate complex symbols by encoding and modulating a transmission bit string, map the complex symbols on subcarriers, and then configure OFDM symbols via inverse Fast Fourier transformation (IFFT) and cyclic prefix (CP) insertion. Also, during data reception, the baseband processor 3e-20 may split a baseband signal provided from the RF processor 3e-10 in OFDM symbol units, restore signals mapped to subcarriers via FFT, and restore a reception bit string via demodulation and decoding.

The baseband processor 3e-20 and the RF processor 3e-10 may transmit and receive a signal as described above. Accordingly, the baseband processor 3e-20 and the RF processor 3e-10 may be referred to as a transmitter, a receiver, a transceiver, or a communicator. In addition, at least one of the baseband processor 3e-20 or the RF processor 3e-10 may include a plurality of communication modules to support a plurality of different wireless connection technologies. Also, at least one of the baseband processor 3e-20 or the RF processor 3e-10 may include different communication modules to process signals in different frequency bands. For example, the different wireless communication technologies may include a wireless local area network (LAN) (for example, IEEE 802.11), a cellular network (for example, LTE), etc. Also, the different frequency bands may include a super high frequency (SHF) band (for example, 2.NRHz, NRhz), millimeter (mm) wave band (for example 60 GHz), etc.

The memory 3e-30 may store data, such as a basic program, an application program, setup information, etc. for operations of the UE. In particular, the memory 3e-30 may store information related to a second connection node preforming wireless communication by using a second wireless connection technology. Also, the memory 3e-30 may provide data stored according to a request of the controller 3e-40.

The controller 3e-40 may control overall operations of the UE. For example, the controller 3e-40 may transmit or receive a signal through the baseband processor 3e-20 and the RF processor 3e-10. Also, the controller 3e-40 records or reads data on or from the memory 3e-30. In this regard, the controller 3e-40 may include at least one processor. For example, the controller 3e-40 may include a communication processor (CP) performing control for communication and an application processor (AP) controlling an upper layer, such as an application program or the like. In addition, the controller 3e-40 may include a multi-connection processor 3e-42.

Figure 3F:
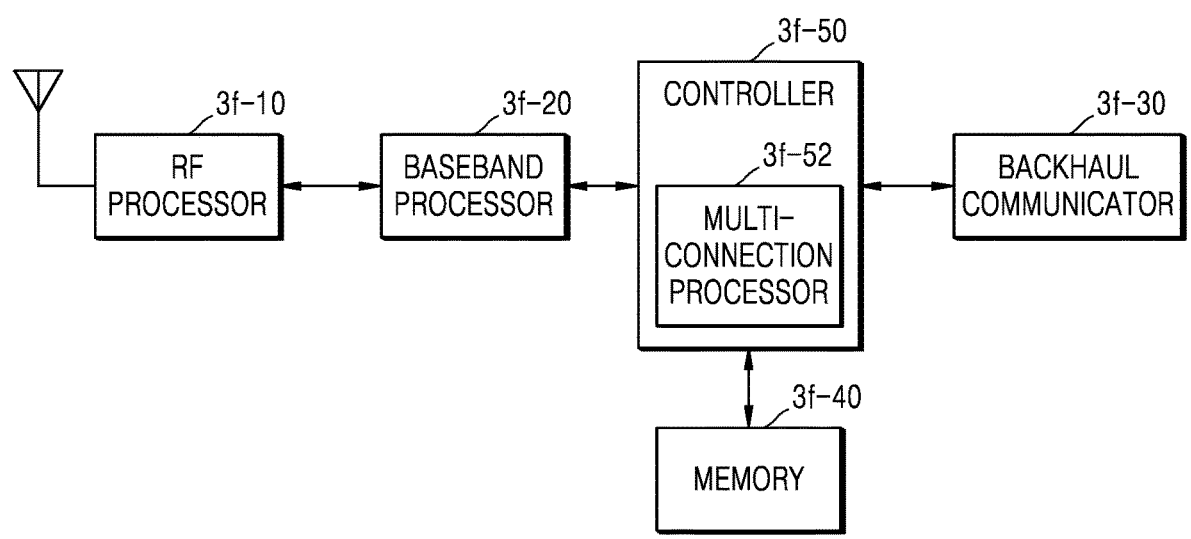
FIG. 3F is a block diagram of a base station according to an embodiment of the disclosure.

FIG. 3F is a block diagram of a base station according to an embodiment of the disclosure.

As shown in FIG. 3F, the base station may include an RF processor 3f-10, a baseband processor 3f-20, a backhaul communicator 3f-30, a memory 3f-40, and a controller 3f-50.

The RF processor 3f-10 may perform functions for transmitting or receiving a signal via a radio channel, such as band conversion or signal amplification. In other words, the RF processor 3f-10 may up-convert a baseband signal provided from the baseband processor 3f-20 to an RF band signal and then transmit the RF band signal through an antenna, and may down-convert an RF band signal received through the antenna to a baseband signal. For example, the RF processor 3f-10 may include a transmission filter, a reception filter, an amplifier, a mixer, an oscillator, a DAC, an ADC, etc. In FIG. 3F, only one antenna is illustrated, but a first connection node may include a plurality of antennas. Also, the RF processor 3f-10 may include a plurality of RF changes. In addition, the RF processor 3f-10 may perform beamforming. For the beamforming, the RF processor 3f-10 may adjust a phase and size of each of signals transmitted or received through the plurality of antennas or antenna elements. Also, the RF processor 3f-10 may perform downlink multiple input multiple output (MIMO) by transmitting at least one layer.

The baseband processor 3f-20 may perform a converting function between a baseband signal and a bit string based on a physical layer standard of a first wireless connection technology. For example, during data transmission, the baseband processor 3f-20 may generate complex symbols by encoding and modulating a transmission bit string. Also, during data reception, the baseband processor 3f-20 may restore a reception bit string by demodulating and decoding a baseband signal provided from the RF processor 3f-10. For example, according to an OFDM method, during data transmission, the baseband processor 3f-20 may generate complex symbols by encoding and modulating a transmission bit string, map the complex symbols on subcarriers, and then configure OFDM symbols via IFFT and CP insertion. Also, during data reception, the baseband processor 3f-20 may split a baseband signal provided from the RF processor 3f-10 in OFDM symbol units, restore signals mapped to subcarriers via FFT, and restore a reception bit string via demodulation and decoding. The baseband processor 3f-20 and the RF processor 3f-10 may transmit and receive a signal as described above. Accordingly, the baseband processor 3f-20 and the RF processor 3f-10 may be referred to as a transmitter, a receiver, a transceiver, a communicator, or a wireless communicator.

The backhaul communicator 3f-30 may provide an interface for performing communication with other nodes in a network. In other words, the backhaul communicator 3f-30 may convert a bit string transmitted from the base station to another node, for example, an auxiliary base station, a core network, or the like, into a physical signal, and convert a physical signal received from another node into a bit string.

The memory 3f-40 may store data, such as a basic program, an application program, setup information, etc. for operations of the base station. In particular, the memory 3f-40 may store information about a bearer assigned to a connected UE, a measurement result reported by the connected UE, etc. Also, the memory 3f-40 may store information for determining whether to provide or stop multiple connection to the UE. Also, the memory 3f-40 may provide data stored according to a request of the controller 3f-50.

The controller 3f-50 may control overall operations of the base station. For example, the controller 3f-50 may transmit or receive a signal through the baseband processor 3f-20 and the RF processor 3f-10 or through the backhaul communicator 3f-30. Also, the controller 3f-50 records or reads data on or from the memory 3f-40. In this regard, the controller 3f-50 may include at least one processor. In addition, the controller 3f-50 may include a multi-connection processor 3f-52.

According to one or more embodiments of the disclosure, cell selection and data or information transmission and reception may be efficiently performed in a mobile communication system.

Various aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include read-only memory (ROM), random-access memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the disclosure can be easily construed by programmers skilled in the art to which the disclosure pertains.

At this point it should be noted that various embodiments of the disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include read-only memory (ROM), random-access memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the disclosure can be easily construed by programmers skilled in the art to which the disclosure pertains.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A method performed by a terminal in a wireless communication system, the method comprising:
triggering a Radio access network Notification Area (RNA) update in a Radio Resource Control (RRC) inactive states based on a certain condition being satisfied, the certain condition including expiration of a timer that triggers the RNA update;
transmitting, to a base station, an RRC resume request message in the RRC inactive state, the RRC resume request message including first information indicating that the RRC resume request message is transmitted to perform the RNA update;
receiving, from the base station, an RRC message in response to the RRC resume request message;
based on the RRC message including second information indicating a transition to the RRC inactive state, identifying RNA configuration information included in the received RRC message; and
transitioning from the RRC inactive state back to the RRC inactive state based on the second information.

2. The method of claim 1, further comprising:
based on the RRC message including the second information indicating a request for mobility speed information of the terminal, restarting a signaling radio bearer (SRB) and transmitting an RRC resume complete message including the mobility speed information of the terminal.

3. The method of claim 2, wherein transmitting the RRC resume complete message includes:
transmitting the RRC resume complete message to the restarted SRB.

4. The method of claim 2, wherein based on the RRC message including the second information indicating the request for the mobility speed information of the terminal, the received RRC message does not include the RNA configuration information.

5. A terminal in a wireless communication system, the terminal comprising:
a transceiver; and
at least one processor configured to:
trigger a Radio access network Notification Area (RNA) update in a Radio Resource Control (RRC) inactive state, based on a certain condition being satisfied, the certain condition including expiration of a timer that triggers the RNA update,
transmit, to a base station, an RRC resume request message in the RRC inactive state, the RRC resume request message including first information indicating that the RRC resume request message is transmitted to perform the RNA update,
receive, from the base station, an RRC message in response to the RRC resume request message,
based on the RRC message including second information indicating a transition to the RRC inactive state, identify RNA configuration information included in the received RRC message, and
transition from the RRC inactive state back to the RRC inactive state based on the second information.

6. The terminal of claim 5, wherein the at least one processor is further configured to:
based on the RRC message including the second information indicating a request for mobility speed information of the terminal, restart a signaling radio bearer (SRB) and transmit an RRC resume complete message including the mobility speed information of the terminal.

7. The terminal of claim 6, wherein the at least one processor is further configured to:
transmit the RRC resume complete message to the restarted SRB.

8. The terminal of claim 6, wherein based on the RRC message including the second information indicating the request for the mobility speed information of the terminal, the received RRC message does not include the RNA configuration information.

9. A method performed by a base station in a wireless communication system, the method comprising:
receiving, from a terminal in a Radio Resource Control (RRC) inactive state, an RRC resume request message, wherein the RRC resume request message includes first information indicating that the RRC resume request message is transmitted to perform a Radio access network Notification Area (RNA) update is performed, and wherein the RNA update is triggered in the RRC inactive state based on a certain condition being satisfied, the certain condition including expiration of a timer that triggers the RNA update; and
transmitting, to the terminal, an RRC message in response to the RRC resume request message,
wherein based on the RRC message including second information indicating a transition to the RRC inactive state, RNA configuration information is included in the transmitted RRC message, and
wherein the second information causes the terminal to transition from the RRC inactive state back to the RRC inactive state.

10. The method of claim 9, wherein based on the RRC message including the second information indicating a request for mobility speed information of the terminal, the second information causes the terminal to restart a signaling radio bearer (SRB) and transmit an RRC resume complete message including the mobility speed information of the terminal.

11. The method of claim 10, wherein the RRC resume complete message is transmitted to the restarted SRB.

12. The method of claim 10, wherein based on the RRC message including the second information indicating the request for the mobility speed information of the terminal, the RNA configuration information is not included in the transmitted RRC message.

\* \* \* \* \*